United States Patent [19]

Ozols

[11] 4,138,600
[45] Feb. 6, 1979

[54] FORCE-RESPONSIVE DEVICE

[76] Inventor: Karlis V. Ozols, 44 Thorne Ave., Mount Kisco, N.Y. 10549

[21] Appl. No.: 790,045

[22] Filed: Apr. 22, 1977

[51] Int. Cl.$^2$ .................... H01H 35/14; H01H 29/00
[52] U.S. Cl. ............... 200/61.47; 200/33 A; 200/56 A; 200/182; 200/186; 200/188; 200/189; 200/215; 200/221; 200/224; 200/229; 200/233
[58] Field of Search .............. 200/33 A, 61.47, 61.93, 200/61.48, 61.52, 80 A, 81.9 HG, 83 F, 182, 183, 186–189, 191–195, 201, 204, 208, 197, 212, 214–219, 220–229, 233, 235, 236, 185; 73/382 R, 382 G; 335/47, 48, 49, 54, 55, 56

[56] References Cited

U.S. PATENT DOCUMENTS

| | | | |
|---|---|---|---|
| 558,650 | 4/1896 | Kennedy | 200/185 X |
| 1,830,673 | 11/1931 | Noren | 200/220 X |
| 1,974,411 | 9/1934 | Cole | 200/189 X |
| 2,044,882 | 6/1936 | Howard | 200/61.47 X |
| 2,151,701 | 3/1939 | Hudson | 200/219 |
| 2,232,590 | 2/1941 | Craig | 200/225 |
| 2,249,738 | 7/1941 | Brownfield | 200/185 X |
| 2,250,212 | 7/1941 | Suits | 200/33 A |
| 2,588,424 | 3/1952 | Speaker | 200/61.47 |
| 2,823,367 | 2/1958 | Huron | 200/61.47 |
| 2,935,579 | 5/1960 | Fishman | 200/33 A |
| 3,141,084 | 7/1964 | Stromberg | 200/186 |
| 3,161,750 | 12/1964 | Bourdel | 200/194 X |
| 3,342,965 | 9/1967 | Bosch | 200/83 F X |
| 3,596,021 | 7/1971 | Saul | 200/61.93 |
| 3,670,130 | 6/1972 | Greenwood | 200/183 |
| 3,753,175 | 8/1973 | Gillette et al. | 200/182 X |
| 3,786,472 | 1/1974 | Scopacasa | 200/61.47 X |
| 3,955,398 | 5/1976 | Watson et al. | 200/61.47 X |

FOREIGN PATENT DOCUMENTS

| | | | |
|---|---|---|---|
| 283326 | 10/1913 | Fed. Rep. of Germany | 200/33 A |
| 49290 | 11/1938 | France | 200/220 |
| 22525 | 11/1906 | Sweden | 200/33 A |
| 154503 | 12/1920 | United Kingdom | 200/33 A |
| 1023042 | 3/1966 | United Kingdom. | |

Primary Examiner—James R. Scott
Attorney, Agent, or Firm—Karl H. Gross

[57] ABSTRACT

A device is disclosed which, in response to forces acting upon it, such as gravity, inertia, magnetic fields and the like, opens or closes electric circuits or otherwise generates signals which may be used to control predetermined functions.

10 Claims, 11 Drawing Figures

FORCE-RESPONSIVE DEVICE

BACKGROUND OF THE INVENTION

This invention relates generally to a force-responsive device.

More particularly, the invention relates to a force-responsive device capable of measuring time intervals, and still more specifically to a device which is actuatable by changes in velocity, by gravity, by centrifugal force and/or other forces as will become apparent hereinafter.

The device according to the present invention may advantageously be integrated with an electrical switch and/or be connected to electrical signal-generating means.

Devices of the type disclosed herein are especially well suited for applications in rocketry and space-flight, but are not limited to such applications. They can be employed to control the acceleration of a rocket or missile, as well as in the programming of multi-stage firing and instrumentation. Devices known from the prior art for such applications are not satisfactory for reasons known to those skilled in the art, including their large size and weight, complexity of construction and, in many instances, lack of reliability.

There are a great number of commercial applications also. Another application of this device is that of a gravity-deceleration time fuze for smaller caliber field piece projectiles, including bazookas. It is particularly applicable for the ignition of the rocket fuel of a projectile in flight, i.e., after the initial ballistic firing of same.

SUMMARY OF THE INVENTION

Accordingly, it is a general object of the present invention to provide an improved device of the type disclosed herein, which avoids the disadvantages of the prior art.

More particularly, it is an object of the invention to provide a force-responsive device which is simple both as to its operating principle and its construction.

A further object of the invention is to provide such a device which is highly reliable in operation.

A concomitant object is to provide a device of the kind under discussion which is light in weight and requires relatively little space, two considerations which are of particular importance in the application of the novel device for rocketry and space flight applications where both weight and space are at a premium.

Still another object of the invention is to provide such a device which, while not limited thereto, is of particular advantage in rocketry and space-flight programming, staging and instrumentation.

In keeping with these objects and with others which will become apparent hereafter, one feature of the present invention resides in an inertia-responsive device for use with a movable body, e.g. such as a single-stage or multi-stage rocket, which is capable of acceleration and/or deceleration. The novel device may comprise container means (e.g. of electrically insulating material, such as synthetic plastic or glass) forming at least two spaced compartments and at least one flow-restricting passage connecting these compartments.

A quantity of flowable material will be accomodated in the container means and be adapted to flow between the compartments and through the passage as a function of gravity and/or changes in the velocity acting upon the device.

The material may be electrically conductive and cooperate directly (i.e., by physical contact) with electrical means (described below) used to monitor the position and/or flow of the material. Suitable materials include mercury, any amalgam thereof, finely divided metallic particles of substantially uniform size (preferably spherical) or any electrolyte. If the device is to be responsive to changes (e.g. appearance or disappearance) of a magnetic field, the material will be a paramagnetic and/or ferromagnetic or diamagnetic material.

Electrical means are connected to the compartments and the passage and operative for monitoring the position and/or flow of the material in the container means. The electrical means may constitute switch means or it may constitute a signal-generating means or be connected to the latter.

The foregoing and other objects of the present invention will become fully apparent from the following description of some currently preferred embodiments of the invention, which should be read in conjunction with the accompanying drawing but should be understood to be exemplary only.

DESCRIPTION OF PREFERRED EMBODIMENTS

Figure 1:
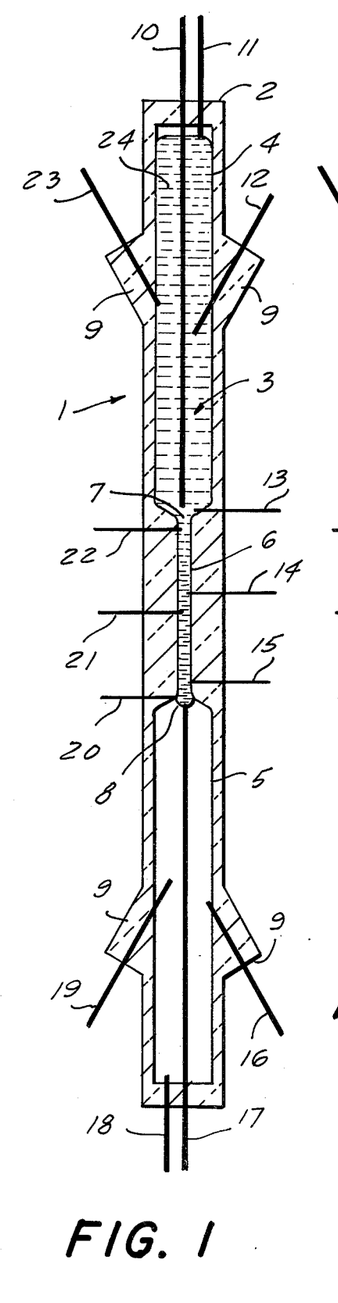
FIG. 1 is a diagrammatic side elevational view of one embodiment of the invention, in a first state.
Figure 2:
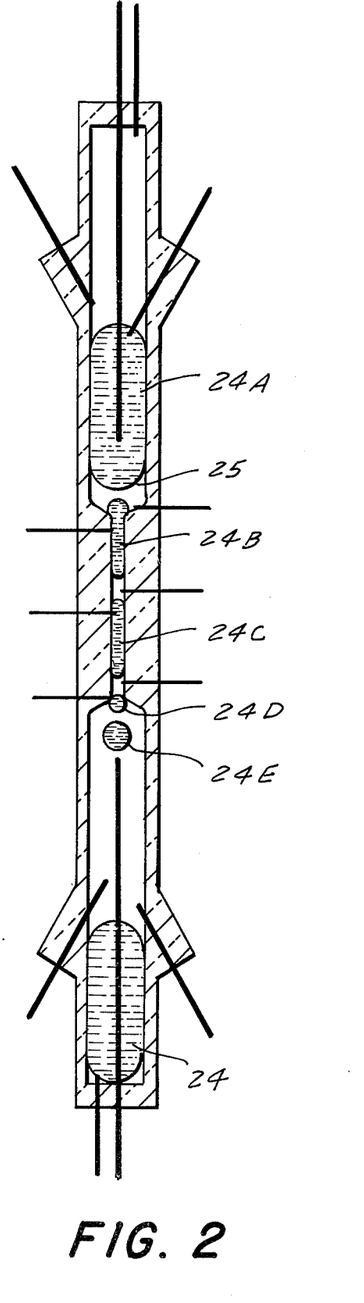
FIG. 2 is a view similar to FIG. 1 but showing the device of that Figure in a second state.

Referring firstly to FIGS. 1 and 2, there is shown an embodiment of the invention in the form of a switch arrangement having an outer cylindrical housing 1 bounding within its walls 2 an interior hourglass-shaped container having an upper cylindrical chamber or compartment 4, a lower cylindrical chamber or compartment 5 and a connecting restricted passageway 6.

The upper chamber 4 is provided with electrical contact elements 10, 11, 12 and 23, of which elements 12 and 23 extend into and through oblique bosses 9 of the housing 1. Lower chamber 5 has similar elements 16, 17, 18 and 19, of which elements 16 and 19 extend through additional oblique bosses 9 of the housing 1. Contact elements 10, 11 extend through the upper end of the chamber 4, parallel to the central axis thereof. The contact element 10 extends substantially to the beveled annular end face 7 of the upper chamber 4. This contact element or electrode 10 terminates just slightly above the restricted connecting passageway 6. The electrode 11, on the other hand, terminates just inside the upper end of the chamber 4. The elements 17, 18 have the same relationship to chamber 5 and end face 8 thereof as do the elements 10, 11 to chamber 4.

These various contact elements may be formed by sealing metal wires or conductive filaments into the wall of the container 3.

It will be noted that the oblique contact element 23 extends just slightly inwardly through the side wall of the chamber 4, whereas the element 12 extends closely adjacent to the central axial contact element 10 of the upper chamber 4. These various elements may also be adjustable within the chamber 4, being mounted to be shiftable lengthwise of themselves with suitable means being provided for sealing them to the walls through which they pass.

Along and adjacent the restricted neck passageway 6 are the electrodes 13, 14, 15, 20, 21 and 22.

These electrodes extend transversely into and through the wall 2 of housing 1 and into the inner container, and they are arranged in pairs 13 and 22, 14 and 21, and 15 and 20, slightly offset from one another.

In the lower chamber 5 there is a duplication of the elements already discussed above, and as shown in FIG. 1.

In the embodiments of FIGS. 1 and 2, the housing and container 3 may be of glass, plastic, aluminum, steel, or other materials not subject to chemical or corrosive attack by the body 24 of fluid or flowable material or substance in the container 3. Desirably, the container material is of electrically insulating material or the contact elements are insulated from such material by suitable sliding or sealing contacts. The contact elements themselves may be slidable bars or wires of copper, aluminum, graphite or carbon or any other suitable electrical conductor.

In this embodiment the capillary adhesion of medium M and the surface tension of the latter, coact with the force of acceleration or deceleration to make the embodiment operate in the capacity of a valve; the contact medium flow may commence at the outset of a predetermined rate of acceleration or deceleration, or at the instant of initial acceleration or deceleration, by precalibration of the device.

In operation, the contact medium M may be statically balanced (i.e., due to surface tension and friction against the surface of passage 6) until the required acceleration or deceleration rate is reached. The axis of the device of FIG. 1 may be set to be fully or substantially coincident with the direction of acceleration or deceleration of the moving body, e.g. rocket. Normally, the volume and capacity of the chambers 4 and 5 and the construction of the passageway 6 are so selected that an amount of the substance 24 will remain in contact with the elements 13-15 and 20-22 at all times, and also with the ends of the elements 10 and 17.

At the extremes of the measurement in either direction, the elements 11 and 18 will be in electrical communication. Normally, in intermediate positions the elements 12, 23, 16 and 19 will also be in electrical communication. As shown in FIG. 2, where a mercury or other finely divided conductive flowable material is utilized, such as powdered metal or powdered graphite particles or other powdered electrically conductive material, the flowable material will separate into two or more bodies, 24a-24f, e.g. adjacent the faces 7 and 8 at the inlets of the restrictive passage 6 or e.g. in reverse direction against the bottom and wall of chamber 5 and the lower inlet of the restrictive passage 6.

Even if the embodiment of FIGS. 1 and 2 is positioned at an angle of, say 45°, to the direction of motion, it would be subject to components of force in both directions, such as laterally and forwardly and rearwardly, to give some measurement of the directional movement in two directions at angles to one another.

Figures 3, 4, 5:
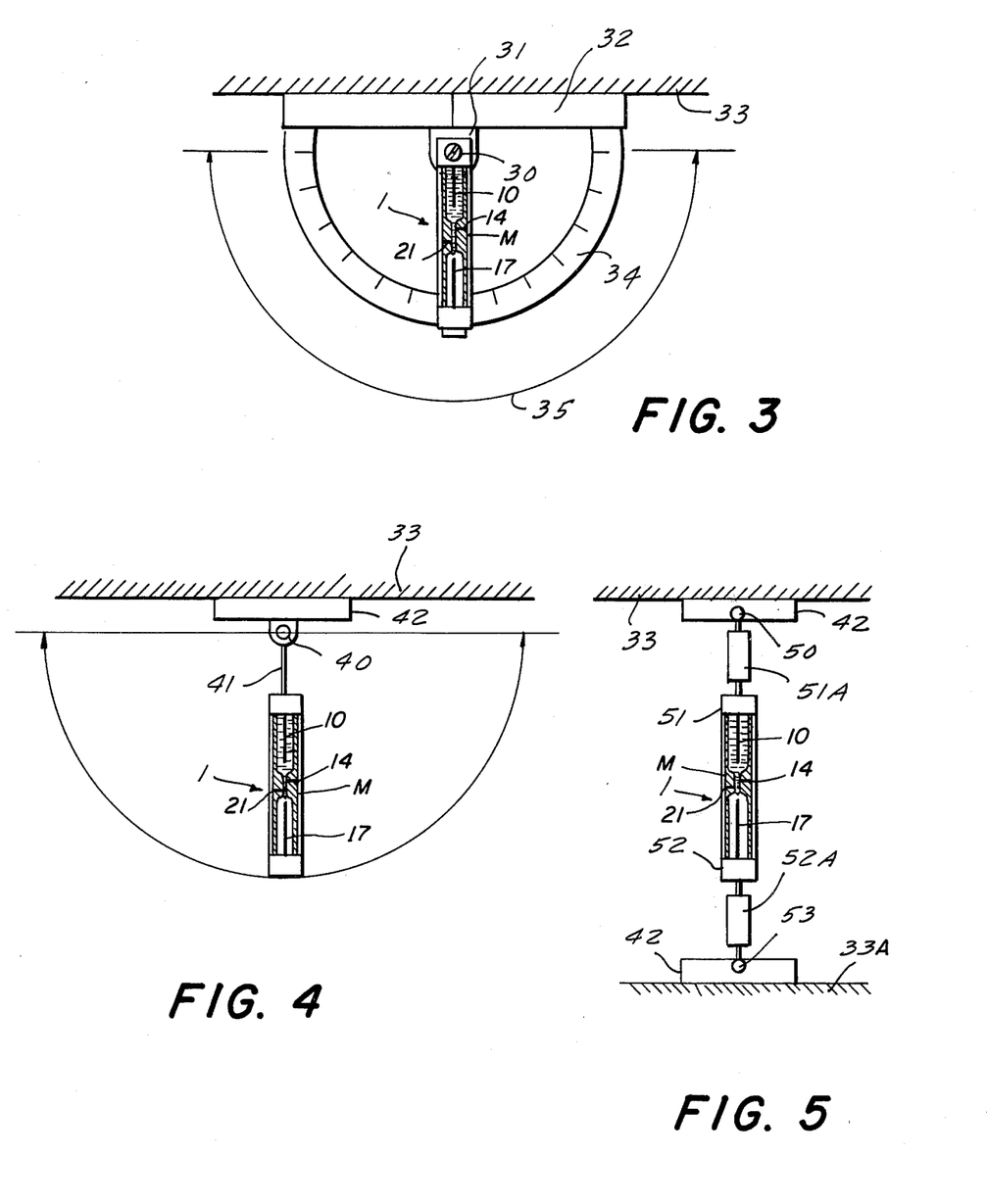
FIG. 3 is an elevational view showing a further embodiment of the invention.
FIG. 4 is a view similar to that of FIG. 3 but illustrating another embodiment.
FIG. 5 is a view which is also similar to FIG. 3 but which illustrates yet another embodiment.

Referring to FIG. 3, the device of the invention is shown pivotally mounted at 30 upon a support 31 which has a base 32 mounted on a wall 33. The device 1 is adjustable over 180°, as indicated by the arcuate arrow 35. The exact position may be determined by means of the arcuate graduated scale 34 with reference to which device 1 may be fixed by e.g. a set-screw (not shown).

In the embodiment of FIG. 4, the device 1 may swing freely (i.e., analogously to a pendulum) from the connection 41 to the pivot 40 which is mounted via a block 42 upon the wall 33. By swinging to an inclined position determined by the movement of the vehicle, the acceleration or deceleration may be measured.

In FIG. 5, the device 1 is mounted between two end caps 51, 52 which in turn have extensible connections 51a, 52a connecting them via blocks 42, at respective pivots 50, 53 to the wall structure 33A.

In the arrangement shown in FIG. 5, the wall structures 33, 33A may be moved in respect to each other to set the device 1 to a predetermined oblique position.

The electrodes shown in FIGS. 3–5 are representative of any combination of electrodes, such as those electrodes which are shown in FIGS. 1 and 2;

When the container is set (or adjusts itself, as in the case of the pendulum mount) to extend parallel to the gravitational pull — i.e., normal to the center of the earth — as e.g. a rocket is launched (rockets are launched vertically, as a rule), then the force acting on the the device will be composed of gravitational pull and acceleration. The medium M, which was retained against flow by its surface tension until acceleration began, will then flow through the orifice(s) at a rate governed by these two forces acting on it. Rockets, however, remain in vertical flight only for a relatively short time and then begin to veer off (from the original flight axis) to enter their trajectory, e.g. to enter a trajectory which will permit insertion into orbit. If the container is fixedly mounted it will share in this attitudinal change of the flight vehicle, i.e. the flow path in the container will become inclined to the original flight axis in the same manner as the vehicle is inclined thereto. This will influence the rate of flow of the medium M through the orifice, because there will now be a component of force (e.g. gravity) acting on the liquid transverse to the flow path, instead of lengthwise of it as during the initial vertical flight. If, however, the container is mounted as a pendulum, it can automatically readjust its position as the flight vehicle veers off the original vertical flight axis; in other words, the container (and the flow path) will always remain oriented parallel to the gravitational pull.

Figure 6:
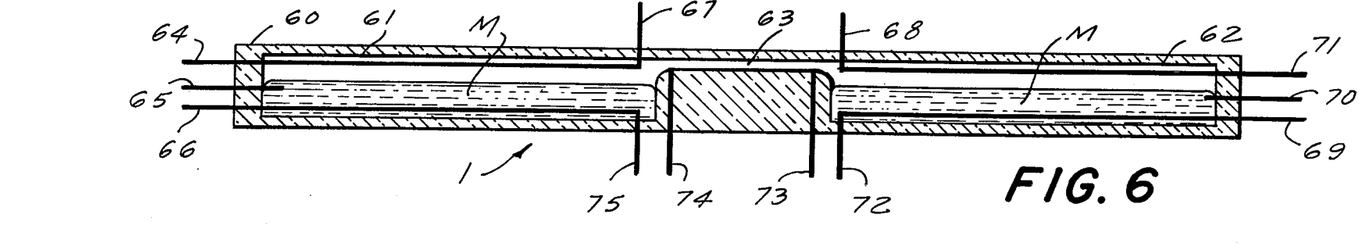
FIG. 6 is a diagrammatic side elevational view of an additional embodiment of the invention in one position.
Figure 7:
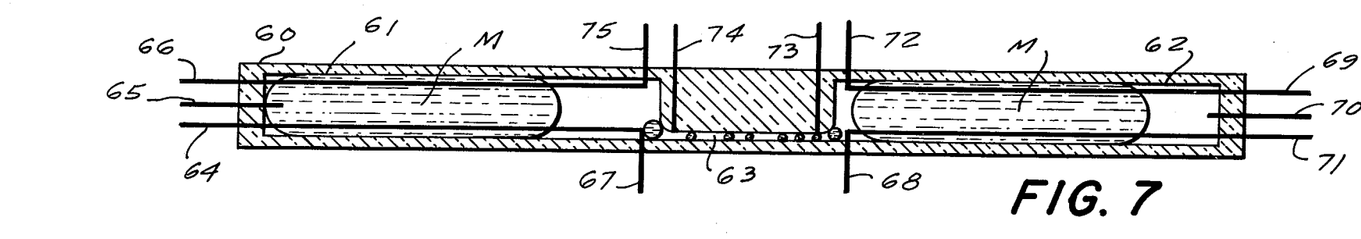
FIG. 7 is a view similar to that of FIG. 6 but showing the device an an alternative position.
Figure 8:
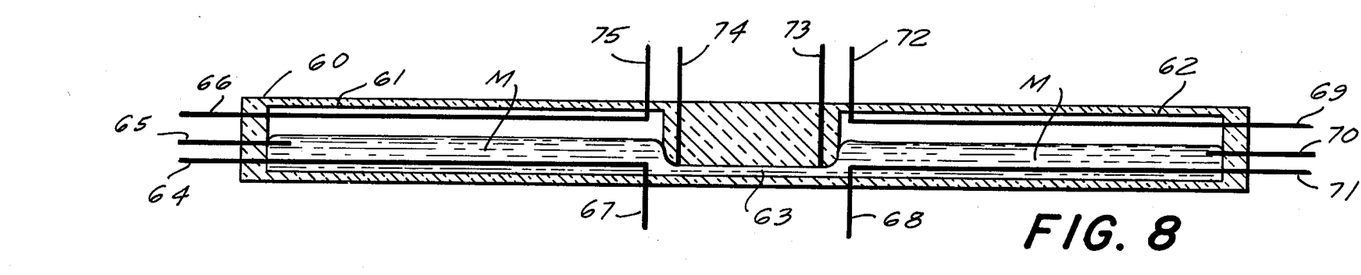
FIG. 8 is a view similar to FIG. 6 but showing the device in still another position.

The embodiment in FIGS. 6 to 8 shows the device in horizontal position, with outer housing 60 and with the inner container having chambers 61, 62 and restricted passage 63, and this device is rotatable 180° about its longitudinal axis for commencement or for the termination of flow of the contact medium.

The chambers 61 are located at the left and the chambers 62 at the right; they contain electrically conductive fluid or flowable material M. The electrical connections, as shown, are somewhat different from those shown in FIGS. 1 and 2. To the restricted passage 63 there are electrical connections at the ends thereof, namely 67, 74 and 75 at one end and 68, 72 and 73 at the other end.

The chamber 61 has electrical connections 64, 65 and 66 whereas chamber 62 has similar connections 69, 70 and 71; in both chambers the connections are at the respective outer ends.

It will be noted that the passage 63 is shown in FIGS. 8 and 7 in a lowermost position and that in FIG. 6 the passage 63 is shown in an uppermost position.

The electrical contact elements may be sealed within the wall of the container or they may be slideable lengthwise of themselves from outside the container. These contact elements are situated at the initial level of the contact, and are adjustable in depth within the contact medium M, for variation of the resistance value, and/or to change the instant of breaking the circuit, when said contact medium M begins to flow through the restrictive orifice formed by the passage 63. This condition prevails at both ends of the container.

Additional contact elements could be placed at predetermined intervals, or along the entire length of the passage 63.

These contact elements may be employed to program and make and break circuits at any predetermined time intervals. The time interval for making or breaking contact between any given set of contact elements would be varied by the rate of flow of the medium M which depends upon the gravitational force or changes of velocity to which the novel device may be subjected. In fact, the device provides means to record the change of velocity rate and inertia.

The housing is a structural part which is used as a means for retaining and mounting the container proper, with a bracket for setting a predetermined elevation angle, for time delay variations.

Adjustment control means for time-delay variations may be provided. For example, it is possible to use adjustable electrical contact elements, adjustable in relation to the top level surface of the contact medium M or to the electrical resistance of the immersed contact elements to the contact medium, or in the electrical resistance of the contact medium, which is determined by the cross-section and the relative distance between the said contact elements.

Adjustment control of the elevation tilt angle relative to the horizontal plane is also possible and this will affect the flow rate of the contact medium M by the variation of head pressure, gravity, centrifugal force, angular and linear acceleration or deceleration.

In the case of a stationary condition of the body (e.g. rocket) in which the device is employed, the flow rate of the contact medium M varies as the sine of the tilt angle included with the horizontal plane, which is normal to the gravitational force line, which would be modified by the correction factors of flow friction, viscosity, head pressure, hydrodynamics of the orifice (passage) configuration, and length of (passage) orifice.

The same would apply, as stated above, if the device were subjected to acceleration or deceleration, and/or centrifugal forces, except that the flow rate of medium M would be affected by the value of the resultant of the force vectors and the contact-medium inertia factors.

This device also provides means for registering the instant of free fall or of a cessation of changes in velocity.

Vibrations would cause the stream of the contact medium to be ruptured into separate droplets (see e.g. FIG. 2); consequently, this could be signalled as interruptions of the continuity in the circuit current, which would correspond substantially to the vibrating frequency, or an irregular sequence, as the causative factor might be.

The contact medium M should be enclosed in the container, preferably under hermetically sealed conditions, within an inert gas atmosphere, such as helium, or in a vacuum in order to prevent the inert gas from interfering with the normal flow of the contact medium, or by-pass may be required for the gas to flow freely from the chamber out of which it is being displaced by the contact medium M into the chamber from which contact medium passes out.

Recycling of the contact medium flow, at the same rate, in one direction and/or in reversed direction, could be obtained by providing means for rotating the container through 180°. The recycled 180°-reversed flow rate would be the same as in the initial phase flow, if the second section or chamber is hydrodynamically similar to the first section or chamber.

A different flow rate could also be attained for the recycled 180° reversed-flow, if the sections and the corresponding ends of the orifice or passage were hydrodynamically different.

The programming sequence could be reversed by the recycling if so required.

Any plurality of separate containers may be interconnected in parallel (simultaneous flow) to a common pool or reservoir for the contact medium, at either or both ends of the containers, for certain kinds of programming.

Any plurality of separate containers may be interconnected at either or both ends for a circulating or sequential (in series) flow, when recycled, with or without a contact medium in each container, if required for programming.

Any plurality of separate containers may be connected in a series, for sequential flow, with or without a contact medium in each, for special programming.

Any plurality of separate containers may be connected, in a series, for sequential re-circulating flow, with or without a contact medium in each. This may be particularly applicable, though not necessarily be limited to, the employment of the inertia of the contact medium, in the change of angular velocity. The preferable configuration of the containers in a series for recirculating flow would be a circular or spiral shape, the center of which would coincide with the rotational center of the container.

The mounting method of the novel device, relative to the rocket or other movable body, may be stationary, spring suspended, oscillating, rotating, or suspended as a free pendulum, depending on the required condition.

Figure 9:
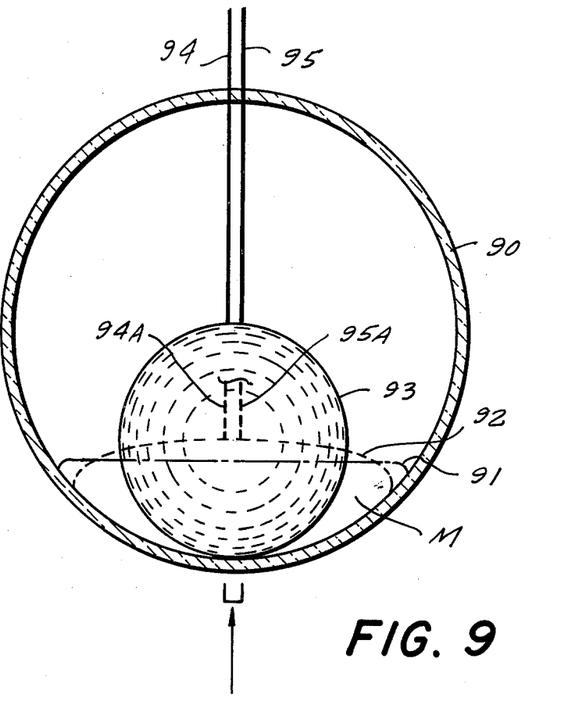
FIG. 9 is a diagrammatic elevation showing an additional embodiment.

A further embodiment of the invention is shown in FIG. 9, in diagrammatic form. The housing of the device is designated with reference numeral 90 and contains body M of flowable medium. Under steady state conditions the surface of the body M is the one indicated ar 91. The device of FIG. 9, however, is intended to detect the instant at which zero gravity (i.e., from free fall) commences and terminates. For this purpose it makes use of the surface tension of the medium M, i.e., the phenomenon that under zero gravity the surface tension of the medium will cause it to form into a globule, i.e., a spherical body.

When in steady state, e.g. subject to acceleration in the direction of the arrow U, the surface configuration 91 will obtain for the medium M. As a change in steady state occurs, e.g. as zerogravity condition approaches, the medium M will be influenced thereby and the surface 91 will change to the surface configuration 92. Two electrodes 94 and 95 extend through the housing 90 in suitable electrically insulated relationship. If it is desired to detect the approach of zero-gravity, the ends of these electrodes could be located as at 94a, 95a, i.e., in such a manner that an electrical circuit will be closed across them when the ends 94a, 95a are contacted by the surface 92 of the conductive medium M. Of course, the electrodes 94, 95 may be mounted to be shiftable (or otherwise adjustable) lengthwise of themselves relative to the housing 90, so that their ends can be selectively placed into the positions indicated at 94a, 95a and/or to other positions closer to or farther from the surface configuration 91.

At the moment zero-gravity occurs, the surface tension of the medium M will cause the same to contract into the shape of a spherical body 93. If the ends of the electrodes 94, 95 are so positioned (see the solid-line showing in FIG. 9) that they are just contacted by the surface of the newly-formed body 93 — whose diameter can of course be pre-calculated — then the circuit across the electrodes 94, 95 will be completed the moment free fall or zero gravity occurs and, hence, this will be an instantaneous indication that free fall has commenced. Conversely, of course, at the moment free fall terminates (i.e., some degree of gravitational force returns or a change of velocity or of the direction occurs) the spherical body 93 will begin to flatten out (and eventually return to the surface configuration 91); as this flattening-out begins the surface of the body 93 will recede from contact with the ends of the electrodes 94, 95 and the circuit across the electrodes will be interrupted, providing substantially instantaneous indication that free fall is terminated.

Figure 11:
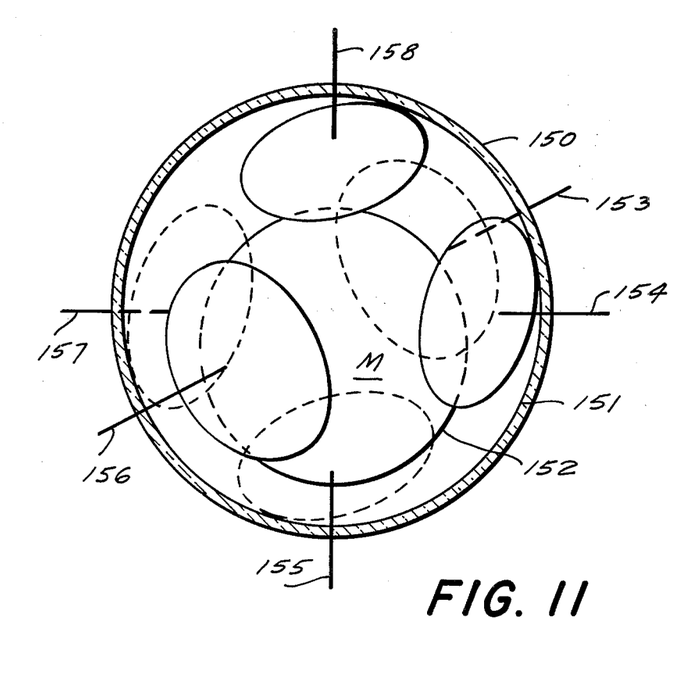
FIG. 11 is a side elevation, in diagrammatic form, of still another embodiment of the invention.

The embodiment in FIG. 11 makes use of the same phenomenon as in FIG. 9, except that here the housing is identified with numeral 150 and may be of spherical shape. Its interior 151 accommodates a body M of the flowable medium which under the influence of zero-gravity again assumes spherical shape. The interior 151 is large enough to permit the sphere M, whose surface is indicated at 152, to float in the housing 150.

The spherical housing 150 is provided with six sensor plates of electrically conductive material and oriented respectively on three coordinate axis, orthogonal to each other as shown; each of these plates is connected to an electrode (i.e., electrical conductor) 153-158, respectively. The remainder of the electrical circuit is not shown, neither in this Figure nor in any of the others, since it does not form part of the invention and can be of any of the various electrical circuits known per se. The space in interior 151 that is not occupied by the medium M may be evacuated and then filled with a gas or other fluid of greater buoyancy than the medium M; the purpose of this fluid would be to dampen the oscillations of the medium M under free-fall conditions and/or such fluid may also serve as an electrolyte and/or as an electrically non-conductive substance.

When changes in the free-fall state occur, i.e., when the body in or on which the device of FIG. 11 is installed becomes subject to some gravity (e.g. due to acceleration or, in interplanetary space, due to the body entering the gravitational field of a celestial body) the spherical mass M will move relative to the sides of the housing 150, i.e., it will approach one side or set of sides and recede from the other. This will result in a change of capacitance in the circuit connected to the sensing plates via the electrodes 153-158 and will thus provide not only an indication that the gravity in acting upon the device, but also in which direction the gravitational pull is being exerted.

Instead of an arrangement using fluctuations in the capacitance of an electrical circuit, the device of FIG. 11 could make use of light beams which are interrupted by movement of the mass M within housing 150.

Figure 10:
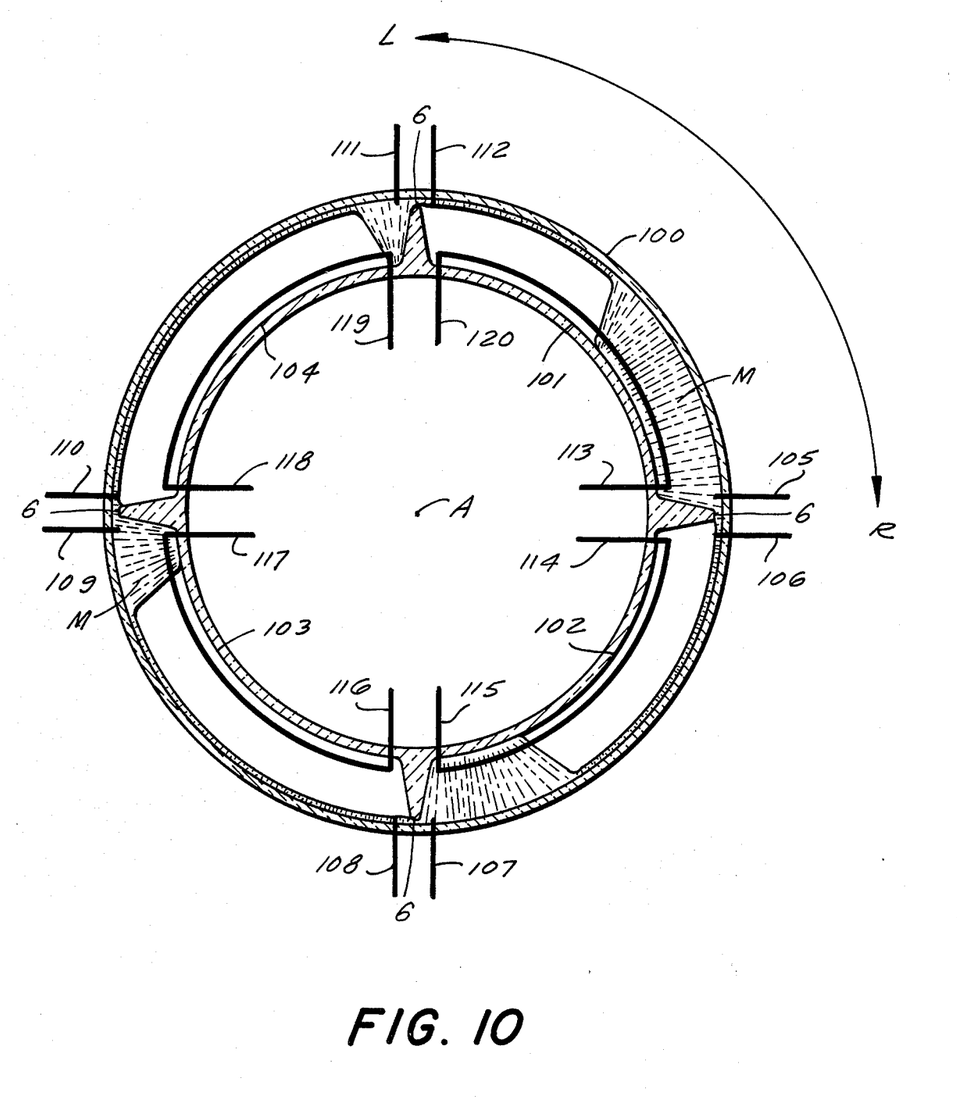
FIG. 10 is a diagrammatic top plan view of yet another embodiment of the invention.

Finally, FIG. 10 shows an embodiment in which the contact medium is constantly recycled. The toroidal housing has reference numeral 100 and the container within it is composed of a ring of chambers 101, 102, 103 and 104 (there could be only one chamber or any number of chambers which are always connected by flow-restricting orifices or passages so that the entire interior space of the chambers is, in effect, a single connected space). At angularly spaced locations of the housing there are provided outer pairs of electrodes 105-106, 107-108, 109-110 and 111-112, as well as inner pairs of electrodes 113-114, 115-116, 117-118 and 119-120. The housing 100 is mounted for rotation about the axis A, e.g. it may be mounted on a driven rotary shaft having the axis A or it may be freely turnably mounted on a pivot having the axis A.

The operation of the device in FIG. 10 is essentially the same as the basic operation described with reference to FIGS. 1 and 2. However, the device in FIG. 10 is especially suitable for (but not limited to) detecting changes in angular velocity of the body (e.g. rocket, missile) on which it is mounted. The contact medium M can recirculate any desired number of times in the same direction without any interruption of registration (of the angular velocity or number of spins per unit time) and without lag for recycling the contact medium.

The housing in FIG. 10 might, instead of being shaped as a torus, have the shape of a solenoid, a spiral, a rectangle, a triangle or the like, so long as the flow path needed to obtain constant unidirectional recirculation of the medium M is provided.

The housing 150 in FIG. 10 might also be subjected to controlled unidirectional rotation about the axis A, at such a rate as to cause the medium M to flow continuously through the respective orifices into the adjacent chambers. The direction of rotation about axis A might be made reversible, depending upon the particular application. The frequency of spin of the body on which the device is mounted could be registered by employing centrifugal force in order to either effect and/or influence the flow of the medium M; in this case, the axis M would need to be mounted normal or substantially normal to the axis of spin of the body. e.g. a rocket.

Instead of using light beams which are interrupted in the embodiment of FIG. 11, optical reflections or optical shadows of the medium M might be employed to register and detect movements and/or other dispacements of the medium M. Changes in resistivity of a circuit completed through the medium M could also be used for this purpose.

A device according to the invention has a large number of uses, some of which have been outlined in the introductory part of this specification. It can register time, vibrations, centrifugal force, frequency of spin of a body on which it is installed, shock of impact, inertia, change of direction, change of velocity, and the presence of absence of gravity.

The flow rate and/or position of the material in the container can be monitored as a function of the variations in the electrical resistance of the material itself or across the electrical contact elements (e.g. electrodes). It can also be monitored by electrical resistance variation through the compartment housing the material (FIG. 11), by required minimum sparking potential through such compartment, by sensing the optical shadow cast by the body of material on the surfaces of the compartment, by optical reflection from the surface of the body of material (which surface changes as the body changes shape in response to variations in gravity acceleration and the like).

As mentioned earlier, the device according to the invention has a wide range of useful applications. It can be used for programming of multi-stage firing and instrumentation, to control acceleration and deceleration, to register free fall, the existence of zero gravity, orbital velocity or the absence of a gravitational field. It can further be used to measure time and time-delay variations, vibrations, centrifugal force, the rate of spin of a body, the shock of impact, inertia, changes of velocity and direction of a body. The device can also be employed for integration of gravitational and other forces over a period of time and to make or break electrical contacts. It has uses not only in military and space flight applications but also in commercial applications.

While the invention has been described and illustrated with particular reference to certain embodiments, it should be understood that this has been done only for the purpose of explaining the invention to those concerned with the art. No inference should be drawn that the invention is in any way limited to or by the illustrated embodiments, inasmuch as the scope of protection which it is sought to secure by United States Letters Patent is defined exclusively in the appended claims.

I claim:

1. An inertia-operated device for use with a movable body which is capable of acceleration and/or deceleration, comprising
    container means forming at least two spaced compartments and at least one flow-restricting capillary passage connecting said compartments and forming the sole communication between them;
    a quantity of electrically conductive flowable material in said container means and adapted to flow between said compartments and through said passage as a function of changes in the velocity of said body; and
    electrical monitoring means connected to said compartments and said passage and operative for monitoring the position and flow of said material therein as a function of resistance-value changes which result from changes in the position of said electrically conductive flowable material.

2. A device as defined in claim 1, wherein said compartments are toroidal and are axially aligned with one another and with said passage, said electrical means comprising a plurality of electrodes having portions of different lengths exposed in said passage to contact with said electrically conductive flowable material so as to obtain said resistance-value changes.

3. A device as defined in claim 1, wherein said compartments each have an axis, said axes being aligned with one another and said passage having a longitudinally extending passage axis which is laterally offset from and parallel to said aligned axes.

4. A device as defined in claim 1, and further comprising mounting means for mounting said container means on a support.

5. A device as defined in claim 4, said container means being elongated and wherein said mounting means comprises pivot means mounting said container means to be pivotable about a pivot axis located adjacent one end of said container means and inclined to the direction of movement of said body.

6. A device as defined in claim 5, wherein said mounting means further comprises a scale for indicating angular displacement of said container means about said pivot axis.

7. A device as defined in claim 4, wherein said mounting means comprising resilient mounting elements which are respectively connected between and pivotable relative to said support and opposite ends portions of said container means.

8. A device as defined in claim 1, wherein said flowable material is electrically conductive.

9. A device as defined in claim 1, wherein said flowable material is mercury.

10. A device as defined in claim 1, wherein said flowable material is finely divided metallic material.

* * * * *